Aug. 3, 1937.  C. R. HUBBARD ET AL  2,088,703

MACHINERY PACKING

Filed Nov. 2, 1935  2 Sheets-Sheet 1

INVENTORS
Cecil R. Hubbard
and Robert A. Waples
BY
Fraser, Myers & Manley,
ATTORNEYS.

Aug. 3, 1937.   C. R. HUBBARD ET AL   2,088,703
MACHINERY PACKING
Filed Nov. 2, 1935   2 Sheets-Sheet 2
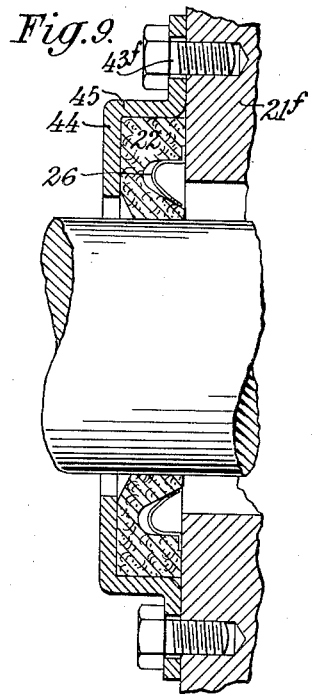
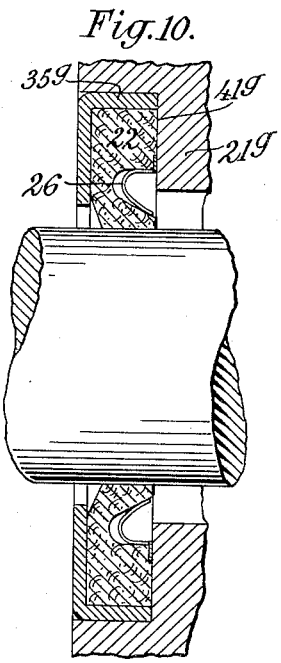
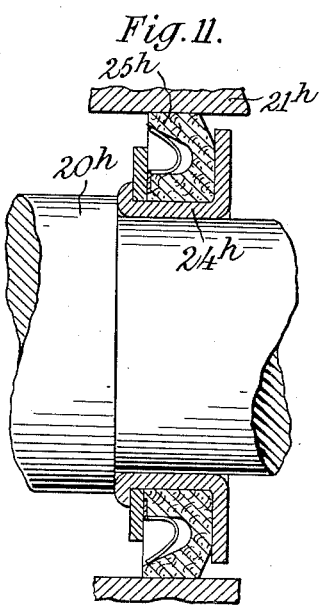
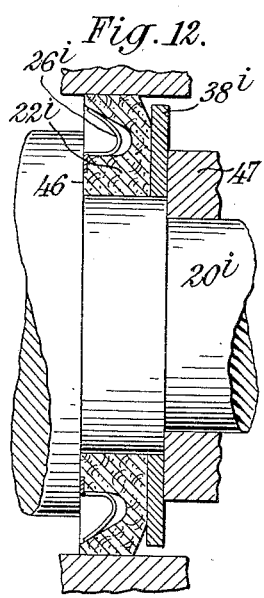
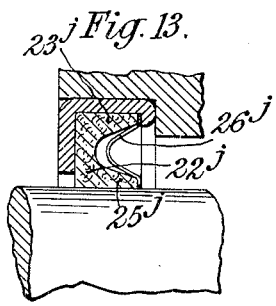
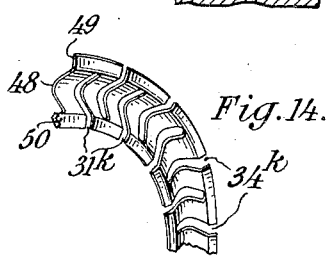
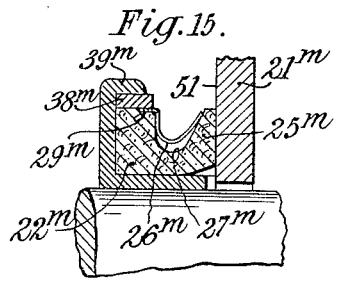
INVENTORS
Cecil R. Hubbard and
Robert M. Waples
BY Fraser, Myers & Manley,
ATTORNEYS.

Patented Aug. 3, 1937

2,088,703

UNITED STATES PATENT OFFICE 2,088,703

MACHINERY PACKING

Cecil R. Hubbard and Robert M. Waples, Palmyra, N. Y., assignors to The Garlock Packing Company, Palmyra, N. Y., a corporation of New York Application November 2, 1935, Serial No. 47,940

7 Claims. (Cl. 288—1)

This invention relates to improvements in machinery packings, and in particular to packings adapted for use as lubricant retainers designed to prevent the escape of grease or oil through the annular space between a pair of relatively movable machine elements, and to exclude dust or other foreign matter.

It is an object of the invention to provide a packing of the above-described character which may comprise a flexible sealing element and a spring, the two parts being of forms and dimensions such that they will be self-centering and also such that the extent to which the spring is flexed when assembled with the sealing element will not be materially affected by variations in the external diameter or axial thickness of the sealing element.

In the accompanying drawings illustrating the preferred and various modified forms of the invention,—

Figure 1:
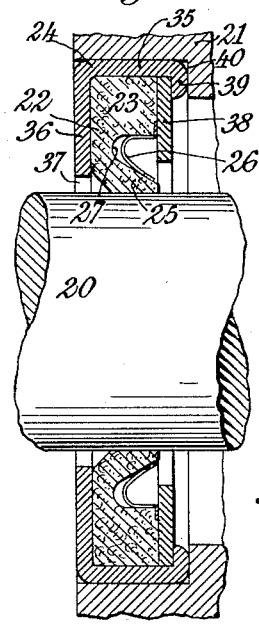
Figure 1 is a sectional view of a lubricant retainer embodying the invention, the retainer being represented as being mounted in the annular space between two relatively rotatable machine elements.

Figs. 5 to 10, inclusive, are views similar to Fig. 1 illustrating modified forms of lubricant retainers embodying the invention.

Figs. 11, 12 and 13 are views similar to Fig. 1 illustrating modified forms of retainers embodying the invention, the retainers in the first two instances being mounted upon the inner one of the two machine elements as distinguished from the retainers illustrated by Figs. 1 and 5 to 10, inclusive, in each of which the retainer is represented as being mounted upon the outer machine element.

Fig. 14 is an enlarged perspective view of a fragmentary portion of the spring illustrated as a part of the retainer shown in Fig. 13.

Fig. 15 is a view similar to Fig. 1 illustrating an oil retainer of modified form adapted to make frictional contact with an annular plane surface as distinguished from a cylindrical surface.

Figure 2:
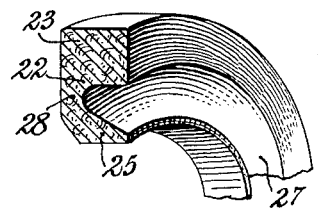
Fig. 2 is an enlarged perspective view of a fragment of the sealing element illustrated in Fig. 1.
Figure 3:
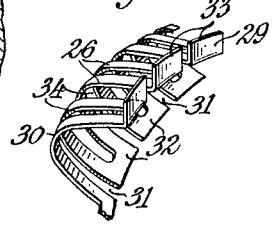
Fig. 3 is a fragmentary perspective view of the spring element of the retainer illustrated in Fig. 1, represented on a scale still larger than that of Fig. 2.

The retainer illustrated by Figs. 1, 2 and 3 is represented as being mounted in the annular space between a pair of relatively rotatable machine elements such, for example, as a rotatable shaft 20 and a surrounding annular housing element 21. The retainer is shown as comprising a flexible sealing element 22 having a body portion 23 seated in a metal casing 24 fixedly secured to the machine element 21 and having a lip 25 held in frictional engagement with the machine element 20 by means of a spring 26.

As most clearly illustrated by Fig. 2, the sealing element is channeled in one of its faces, as at 27, thus providing an annular zone of weakness, as at 28, between the body portion and the lip portion about which the lip portion may be flexed. If desired, the dimensions of the sealing element 22 as compared with the annular space in which it is to be mounted may be such that it will be necessary to slightly compress the parts of the ring radially when it is installed, so that, irrespective of the use of the spring 26, the sealing ring will be held by its inherent elasticity in snug contact with the outer surface of the machine element 20 and the inner surface of the shell 24.

The spring 26 may, as clearly illustrated by Fig. 3, comprise an annular flange 29, adapted to make contact with the annular surface of the body portion of the sealing element adjacent its channeled portion 27, and a channeled portion 30 extending from said flange into the channel of the sealing element, the peripheral portions of the channeled part of the spring being of dimensions such that the spring may be held flexed within the channel of the sealing element when the spring and sealing element are installed in their assembled relations within the joint to be sealed. The free margin of the channeled portion of the spring should be divided, as by inwardly extending gaps 31, into a number of resilient fingers 32, and, if desired, the flanged margin of the spring may also be divided into a circular series of resilient fingers 33 by inwardly extending gaps 34.

As indicated in Fig. 3, the gaps 31, which open into one margin of the spring, may be extended into the spaces between the gaps 34, which open into the opposite margin, so that the spring ring as a whole, as well as either of its marginal portions, may be extensible and compressible.

As shown in Fig. 1, the metal shell may comprise a cylindrical portion 35, against which the outer cylindrical surface of the sealing element may be seated, and an inturned annular flange 36, against which the annular surface of the sealing element opposite its channel surface may be seated. The depth of the flange 36 should be such as to leave a clear space 37 surrounding the machine element 20.

The sealing element 22 and spring 26 may be held in their assembled relations within the metal shell 24 by a retaining ring 38, which may be held tightly compressed against the sealing ring and spring by means of an inturned portion 39 of the element 35 of the shell. By properly dimensioning the parts the retaining ring 38 may be held against the sealing element 22 and spring 26 by the rolled portion 39 of the shell with any desired degree of pressure. The metal shell may be mounted fluid tight in the machine element 21 in any appropriate manner, preferably by making the dimensions of their contacting cylindrical surfaces such that the shell may be forced into the machine element with what is known as a press fit. If desired, the housing may have an inwardly projecting shoulder 40 against which the metal shell may be seated and by which its axial position may be definitely fixed. When the parts are assembled, as indicated in Fig. 1, the lip element 25 of the sealing ring will face the lubricant the escape of which is to be prevented and the flexed spring 26 will tend to force the body portion of the sealing element against the inner surface of the part 35 of the shell and to hold the lip 25 in snug frictional engagement with the machine element 20, thereby effectively sealing the annular space between the parts 20 and 21.

It will be observed that the position of the spring with respect to the sealing ring is determined by the outwardly extending flange 29 and the channeled portion of the spring which extends into the channel in the sealing ring. The spring is therefore in no manner affected by variations of the axial width of the sealing element or by variations in its external diameter. The spring will always be correctly positioned by merely nesting its channeled portion in the channel of the sealing element, applying the retaining ring 38 and rolling down the margin 39 of the outer element of the metal shell.

Figure 4:
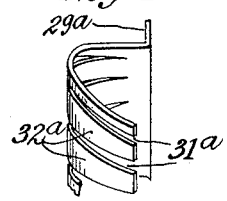
Fig. 4 is a fragmentary view, partly in section and partly in elevation, of a fragmentary portion of a modified form of spring element which may be used as a substitute for the one illustrated by Fig. 3.

If desired, the flanged portion of the spring may be made continuous, as indicated at 29ᵃ in the modified form illustrated by Fig. 4, in which case the opposite margin of the spring, and in fact the entire channeled portion thereof except the part immediately adjacent the flange, may be divided into a circumferential series of resilient fingers 32ᵃ by inwardly extending gaps 31ᵃ.

Figure 5:
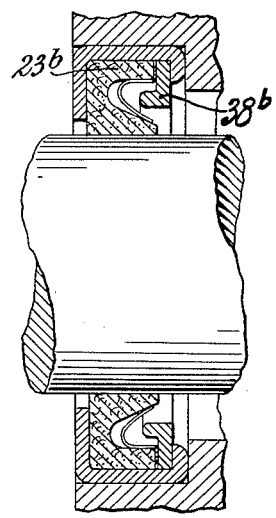

The form of the invention illustrated by Fig. 5 differs from that illustrated by Figs. 1 to 3, inclusive, in that the body portion 23ᵇ is of materially less depth than that of the ring illustrated in Fig. 1, thus enabling the retainer to be mounted in an annular space of relatively small radial dimensions. By varying the depth of the body portion of the sealing ring and correspondingly varying the dimensions of the metal shell and its retaining element, retainers having identical sealing lips and springs may be used to seal joints about shafts of the same size but having surrounding housings of varying dimensions.

If desired the retaining ring may be flanged at its inner margin and the flange may extend into the annular space provided by the channeled portion of the spring 26 as indicated at 38ᵇ in Fig. 5.

Figure 6:
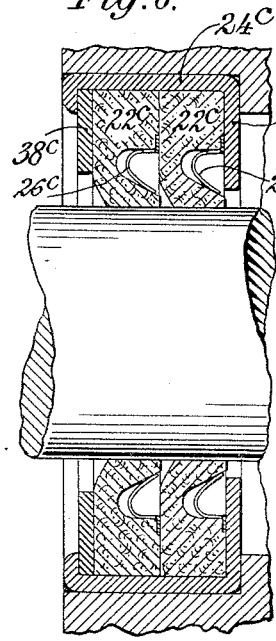

The form of the invention illustrated by Fig. 6 differs from that illustrated by Fig. 1 in that the metal shell 24ᶜ is of increased axial depth and two sealing rings 22ᶜ and their springs 26ᶜ are mounted in the shell in a tandem relation. In the form of the invention indicated in Fig. 6 the integral flange 36ᶜ of the metal shell and the retaining flange 38ᶜ are inverted as compared with corresponding parts of the retainer illustrated by Fig. 1. It will be apparent that it is optional in each form of the invention illustrated as to which flange may be made integral.

Figure 7:
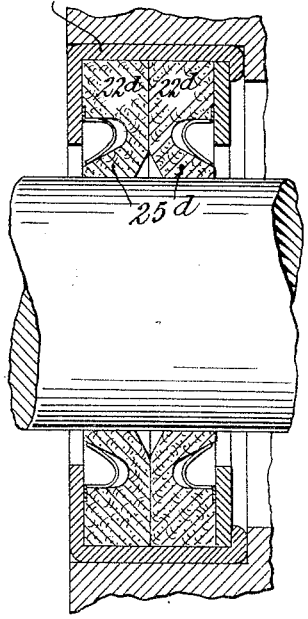

The form of the invention shown in Fig. 7 differs from those hereinbefore described in that two sealing elements 22ᵈ are mounted in the metal shell 24ᵈ with their sealing lips 25ᵈ facing in opposite directions, so that one of said lips is most effective as a seal against the escape of lubricant in the direction in which the other lip is least effective. This form of the invention is effective in sealing the joint against the passage of lubricant in either direction or is effective against the passage of lubricant in one direction and the passage of dust or other foreign matter in the opposite direction.

Figure 8:
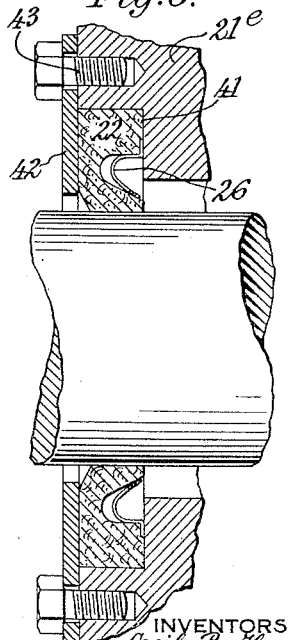

The form of the invention illustrated by Fig. 8 differs from that illustrated by Fig. 1 in that the metal shell is omitted altogether. The sealing element 22 and its spring 26 are mounted directly within a recess 41 in the machine element 21ᵉ and held in place by an annular plate 42 which may be secured to the machine element by tap bolts 43 or other suitable securing means.

The form of the invention illustrated by Fig. 9 differs from that illustrated by Fig. 8 in that the recess 41 in the machine element is omitted and the sealing element 22 and its spring 26 are held compressed between the annular face of the machine element 21ᶠ and an inturned flange 44 of a flanged cup-like retainer 45, the flange of the retainer being secured to the machine element by tap bolts 43ᶠ or other appropriate fastening elements.

The form of the invention illustrated by Fig. 10 differs from that illustrated by Fig. 1 in that the retaining ring 38 and rolled flange 39 are omitted. The sealing element 22 and its spring 26 are mounted directly in a recess 41ᵍ in the machine element 21ᵍ, pressure between the sealing element and spring and the parts with which they are assembled being determined by the axial depth of the cylindrical flange 35ᵍ as compared with the axial depth of the sealing ring.

The form of the invention illustrated by Fig. 11 differs from that illustrated by Fig. 1 in that the metal shell 24ʰ is fixedly secured to the inner machine element 20ʰ and the flexible lip 25ʰ of the sealing element is disposed outwardly instead of inwardly and held in frictional engagement with the outer machine element 21ʰ.

The form of the invention illustrated by Fig. 12 differs from that illustrated by Fig. 11 in that the metal shell is omitted and the sealing ring 22ⁱ and its spring 26ⁱ are mounted directly about the inner machine element 20ⁱ against a shoulder 46 and held in place by a retaining ring 38ⁱ and a backing ring 47.

Fig. 13 differs from the form of the invention illustrated by Figs. 1 and 5 in that the cross-sectional forms of the sealing element 22ʲ and spring 26ʲ are symmetrical, a lip 23ʲ of similar form to the lip 25ʲ being substituted for the body portion 23 or 23ᵇ of the previously described forms referred to.

In Fig. 14 is illustrated on a larger scale a fragmentary portion of a spring adapted for use as a part of the retainer illustrated by Fig. 13. This spring comprises a ring channeled at 48 and flanged at its opposite margins 49, 50, the marginal portions being divided into resilient fingers by inwardly extending gaps 31ᵏ, 34ᵏ, the gaps opening into one margin being extended into the spaces between those opening into the opposite margin so as to produce an annulus of zigzag formation, of which either margin or the structure as a whole may be extended or compressed, and such that the portions of the spring held in contact with the marginal lips of the sealing ring may yield locally at any part of the circumference.

The form of the invention illustrated by Fig. 15 differs from those hereinbefore referred to in that the parts of the retainer and the machine elements with which they are used are so disposed that the lip 25ᵐ is adapted to be held in frictional engagement with an annular plane surface 51 on the outer machine element 21ᵐ. In this form of the invention the sealing ring 22ᵐ has its channel 27ᵐ extending inwardly from its outer cylindrical surface and the spring 26ᵐ has a cylindrical flange 29ᵐ and a channeled portion of a form adapted to enter the channel 27ᵐ of the sealing ring. The retaining ring 38ᵐ and the rolled flange 39ᵐ of the metal shell are cylindrical instead of being radial and the rolled flange of the shell is at the periphery of its radial flange rather than at the periphery of its cylindrical flange, all as clearly indicated in Fig. 15. This form of the invention is well adapted for use when the rotary machine element has a plane annular surface 51 to be engaged by a lip of the retainer.

In making oil seals embodying the herein-described invention the sealing element may consist of rubber composition or of any other suitable material which may be moulded or otherwise caused to have the desired cross-sectional form and possess the requisite degrees of flexibility, resiliency and resistance to change of form, to serve the intended purpose. The springs may be made of any metal or metal alloy adapted to be of a strength and resilience such as to properly hold the elements of the sealing ring in their sealing engagement with the surfaces with which they make contact. It will be apparent from the various modified forms of the invention herein disclosed that by using a sealing element which may be moulded and then vulcanized or otherwise treated to produce an article having the requisite physical qualifications, oil retainers adapted to widely varying conditions may be readily designed since there are no limitations as to the thicknesses or other dimensions of different parts of the ring.

The invention is not intended to be limited to forms of the invention which have been selected for purposes of illustration, but should be regarded as including modifications and variations thereof within the scope of the appended claims.

What is claimed is:—

1. In a machinery packing adapted for use as a lubricant retainer to seal an annular space between two relatively movable machine elements, the combination, with a flexible sealing ring having a pair of annular sealing portions adapted to be maintained respectively in fluid-tight relations with the respective machine elements, and an intervening channeled portion to produce a zone of weakness about which the two annular sealing portions may be flexed, of a spring ring comprising an annular portion, channel-shaped in cross section, having a circumferential flange along one margin and its opposite marginal portion divided radially into a circular series of resilient fingers, the channel-shaped portion of the spring ring being of such form and size as compared with the form and size of the channel in the sealing ring, and the flange of the spring ring being inclined at such an angle with respect to the adjoining part of its channeled portion, that the spring ring and the sealing ring will be adapted to be held in an assembled relation with the flange of the former in snug contact with an annular surface portion of the latter immediately adjacent, but without, its channeled portion, and the opposite marginal portions of the spring ring adapted to be held in forcible contact with opposed surface portions of the sealing ring with the intervening portion of the spring ring flexed.

2. In a machinery packing adapted for use as a lubricant retainer, a combined sealing ring and spring, as defined by claim 1, of which the flanged margin of the spring is also divided radially into a circular series of fingers resiliently united by its intervening portions, thus causing the flanged marginal portion to be resiliently extensible and contractible.

3. In a machinery packing adapted for use as a lubricant retainer, a combined sealing ring and spring, as defined by claim 1, of which the flanged margin of the spring is also divided radially into a circular series of fingers, the radial dividing gaps between the fingers of the two series being extended inwardly in alternation from opposite margins of the spring, the gaps opening into one margin being extended into the parts lying between the gaps opening into the other margin, thus causing the ring as a whole, or either of its marginal portions independently of the other, to be resiliently extensible or contractible.

4. In a machinery packing adapted for use as a lubricant retainer, a combined sealing ring and spring, as defined by claim 1, of which the relative cross-sectional forms of the combined parts are such that the marginal portions only of the spring, including the annular zone adjacent its flange, will make contact with the sealing ring, the portions intervening between such annular zone and the end portions of the resilient fingers being spaced from the adjacent surface of the sealing ring.

5. In a machinery packing adapted for use as a lubricant retainer to seal an annular space between two relatively movable machine elements, the combination, with a flexible sealing ring having an annular body portion to be held in a fixed, fluid-tight relation with one of the elements, an annular lip extended from the body portion and adapted to be held in a frictional, sealing contact with the other of the elements and an annular channeled portion in the ring between the body portion and the lip, of a spring ring comprising an annular portion, channel-shaped in cross section, having a circumferential flange along one margin and its opposite marginal portion divided radially into a circular series of resilient fingers, the channel-shaped portion of the spring ring being of such form and size as compared with the form and size of the channel in the sealing ring, and the flange of the spring ring being inclined at such an angle with respect to the adjoining part of its channeled portion, that the spring ring and the sealing ring will be adapted to be held in an assembled relation with the flange of the former in snug contact with the surface of the body portion of the latter immediately adjacent, but without, its channeled portion, and the opposite marginal portions of the spring ring adapted to be held in forcible contact with opposed surface portions of the sealing ring with the intervening portion of the spring ring flexed.

6. In a machinery packing adapted for use as a lubricant retainer, a combined sealing ring and spring, as defined by claim 5, in further combination with a metal shell adapted to be fixedly secured in a fluid-tight relation with one of the machine elements and comprising a portion against which the body portion of the sealing ring may be held in snug contact and marginal portions between which the body portion of the sealing ring and the contacting flange of the spring ring may be closely confined, whereby the sealing ring and spring will be maintained in an assembled relation with the shell as a self-contained unit.

7. A spring ring adapted for use as an element of a machinery packing of the character herein described, said ring comprising an annulus of channel-like, cross-sectional form and a bordering, marginal flange disposed at an abrupt angle with respect to the adjoining part of the channel-like portion, so that a cross-sectional element of the flange will lie in substantial accordance with a straight line passing through the extremities of the corresponding cross-sectional element of the channel-like portion, the flanged margin of the ring and its opposed, marginal portion each being divided into a circular series of resilient fingers, the dividing gaps between the fingers of the two series being extended inwardly in alternation from the opposite margins of the ring, the gaps opening into one margin being extended into the parts lying between the gaps opening into the other margin, thus causing the ring as a whole, or either of its marginal portions independently of the other, to be resiliently extensible or contractible.

CECIL R. HUBBARD.
ROBERT M. WAPLES.